(12) United States Patent  (10) Patent No.: US 8,261,594 B2
Maehira et al.  (45) Date of Patent: Sep. 11, 2012

(54) LEAK DETECTION SYSTEM

(75) Inventors: Takayuki Maehira, Kanagawa (JP);
Ryuichi Wakamatsu, Kanagawa (JP);
Eiichi Sato, Kanagawa (JP)

(73) Assignee: Ulvac, Inc., Kanagawa (JP)

( * ) Notice: Subject to any disclaimer, the term of this patent is extended or adjusted under 35 U.S.C. 154(b) by 253 days.

(21) Appl. No.: 12/696,387

(22) Filed: Jan. 29, 2010

(65) Prior Publication Data

US 2011/0113862 A1    May 19, 2011

(30) Foreign Application Priority Data

Nov. 19, 2009   (JP) .................................. 2009-264066

(51) Int. Cl.
*G01M 3/04* (2006.01)
*G01M 3/34* (2006.01)

(52) U.S. Cl. ............................................. 73/41; 73/49.3

(58) Field of Classification Search ................... 73/49.2, 73/49.3, 41, 40.7
See application file for complete search history.

(56) References Cited

U.S. PATENT DOCUMENTS

| | | | | |
|---|---|---|---|---|
| 2,086,116 A | * | 7/1937 | Burns ................................ | 73/41 |
| 3,487,677 A | * | 1/1970 | Molitor ........................... | 73/40.7 |
| 4,126,034 A | * | 11/1978 | Conrad ........................... | 73/49.2 |
| 4,667,506 A | * | 5/1987 | Jenkins et al. .................. | 73/45.2 |

FOREIGN PATENT DOCUMENTS

| | | |
|---|---|---|
| JP | 10-038746 A | 2/1998 |
| JP | 3138509 U * | 1/2008 |

* cited by examiner

*Primary Examiner* — Peter Macchiarolo
*Assistant Examiner* — Jamar Ray
(74) *Attorney, Agent, or Firm* — Cermak Nakajima LLP; Tomoko Nakajima

(57) ABSTRACT

A leak detection system has: a test chamber connected to a vacuum pump; a filling device for filling a test piece with helium gas; a transfer device for transferring the test piece between a ready-for-detection position in which the test piece is ready to be carried into the test chamber and a filling-operation position in which the operation of filling helium gas by the filling device is performed; a carrying device for carrying the test piece from the ready-for-detection position to a detection position inside the test chamber; a sealing device for hermetically sealing the test chamber in a state in which the helium-gas-filled test piece is in the detection position; and a leak detector for detecting helium to be leaked out of the test piece when, after having sealed the test chamber by the sealing device, the test chamber is evacuated by the vacuum pump to a predetermined pressure.

7 Claims, 2 Drawing Sheets

LEAK DETECTION SYSTEM

This application claims the priority benefit under 35 U.S.C. §119 of Japanese Patent Application No. 2009-264066 filed on Nov. 19, 2009, which is hereby incorporated in its entirety by reference.

BACKGROUND

1. Technical Field

The present invention relates to a leak detection system which is capable of detecting in succession the presence or absence of a leak from a test piece such as a hermetically sealed vessel, pipe, valve, and the like.

2. Related Art

It has been known to use a leak detector in a leak test or leak detection in which the presence or absence of a trace amount of leak from a test piece such as a hermetically sealed vessel, pipe, valve, and the like is detected or inspected (see, e.g., patent document 1). The leak detector is provided with a mass spectrometer which is arranged: to ionize the gas molecules in the vacuum; and to select only the helium ions to cause them to be incident on an ion collector, thereby quantitatively detecting as the ion current the helium gas that has been leaked into the vacuum. The mass spectrometer is mounted, through a gate valve, on a branch pipe that is branched from an evacuation pipe leading from the vacuum chamber in which a vacuum atmosphere can be formed, to a vacuum pump.

A description will now be made of an example in which the above-described conventional leak detector is used to perform a leak test by disposing a hermetically sealed vessel such as a tank and the like inside a test chamber (vacuum chamber) in which a vacuum atmosphere can be formed. First, the hermetically sealed vessel as a test piece is housed into the test chamber. Then, the test piece is filled with helium gas and, at the same time, the test chamber is evacuated to make it into a vacuum atmosphere. Then, in case there is a leak from the test piece, the presence or absence of the helium gas that is mixed in the vacuum atmosphere is detected by the leak detector.

Generally, the filling of helium gas into the test piece is performed in the following manner. That is, first, the test piece is pressurized by introducing gas such as nitrogen, air, and the like into the test piece, thereby performing a so-called gross leak test. Subsequently, the gas is evacuated out of the test piece, followed by filling the test piece with helium gas. This kind of operation of filling the test piece with helium gas is ordinarily performed along with the operation of evacuating the vacuum chamber.

By the way, there are various kinds of test pieces which are different in volume. In addition, some of such test pieces have small-diameter connection ports for evacuating and supplying gas therethrough. Therefore, there are cases in which much time is required in supplying gas into, and evacuating gas from, the test piece. In such cases, rate-limitation is imposed by the helium-filling operation among the operations of gross leak test through the helium-filling operation. As a result, there is a disadvantage in that the cycle time in leak detection becomes long.

Patent document 1: JP-A-1998-38746.

In view of the above, this invention has a problem to provide a leak detecting system in which the cycle time can be prevented from getting longer and in which the leak test can be efficiently performed when a plurality of test pieces are subjected to leak tests in succession.

SUMMARY

In order to solve the above problems, the leak detection system according to one aspect of this invention comprises: a test chamber connected to a vacuum pump; a filling means for filling a test piece with helium gas; a transfer means for transferring the test piece between a ready-for-detection position in which the test piece is ready to be carried into the test chamber and a filling-operation position in which an operation of filling helium gas by the filling means is performed; a carrying means for carrying the test piece from the ready-for-detection position to a detection position inside the test chamber; a sealing means for hermetically sealing the test chamber in a state in which a helium-gas-filled test piece is in the detection position; and a leak detecting means for detecting helium to be leaked out of the test piece when, after having sealed the test chamber by the sealing means, the test chamber is evacuated by the vacuum pump to a predetermined pressure.

According to the above arrangement, after having filled the test piece with helium gas in the filling-operation position, the test piece is transferred and carried by the transfer means and the carrying means to the detection position inside the test chamber. When the test chamber has reached a predetermined pressure as a result of evacuation thereof, a leak test is carried out. On the other hand, in the filling-operation position, filling of helium gas is carried out to another test piece.

In the filling-operation position, gross leak test is ordinarily carried out before filling the test piece with helium gas. Depending on the kind of test pieces, it may take time to perform a series of operations (these operations are referred to as "filling operation") of supplying of gas to a test piece in a gross leak test and evacuation, and filling of the test piece with helium gas after evacuation of the gas. In this invention, an arrangement has been made such that the operation of filling the test piece with helium gas and the leak test of the test piece can be separately and independently performed in the filling-operation position and in the detection position, respectively. Therefore, even in case time is required to complete the filling operation to one test piece, there is imposed no rate limitation as long as the filling operation can be finished by the time in which the leak test for another test piece is finished. As a consequence, in case leak tests are performed in succession with a plurality of test pieces, the cycle time can be prevented from getting longer. In addition, by providing both the transfer means and the carrying means, the test pieces can be efficiently transferred and carried in performing leak tests.

In another aspect of this invention, preferably, a lower surface of the test chamber is open to access and the transfer means is a turntable which can be driven to rotate. The carrying means includes: at least two supporting plates for respectively supporting thereon a test piece, the supporting plates being disposed on an upper surface of, and at a predetermined distance from each other in a circumferential direction of, the turntable; and a drive means for lifting each of the supporting plates by passing through the turntable so as to bring a peripheral portion of the supporting plate into abutment with the lower surface of the test chamber, the peripheral portion being positioned in a circumference of the test piece. It is thus so arranged that the supporting plate also serves as the sealing means for hermetically sealing the test chamber. According to the above arrangement, the cycle time can be efficiently prevented from becoming long and, in addition, there is materialized a leak detection system in which the number of parts is reduced.

Further, according to a further aspect of this invention, preferably, the filling means includes a coupling with closing function, and a manifold which is connected to the coupling through piping, and at least one of a helium supply pipe, a gas supply pipe for gross leak test, and an evacuation pipe for evacuating the test piece is connected to the manifold respectively through a gate vale. By employing the above-described arrangement, only by operating the gate valves, the filling operation can simply be performed. In addition, by simply releasing the coupling out of engagement, the test piece that has been filled with helium gas is made ready to be carried to the detection position. Therefore, the efficiency in the leak test can be further attained.

According to still another aspect of this invention, preferably, the leak detecting means preferably comprises: a guide pipe disposed by insertion into an evacuation pipe which is connected from the test chamber in which the test piece is disposed to the vacuum pump; and a mass spectrometer for detecting helium, the mass spectrometer being connected to the guide pipe through a gate valve.

According to this arrangement, after the test piece having filled therein with helium gas is disposed inside the vacuum chamber, the vacuum chamber is evacuated to thereby form therein a vacuum atmosphere. At this time, if there is a leak from the test piece, the helium leaking from the test piece is guided into the evacuation pipe through the vacuum chamber. On this occasion, since the guide pipe is disposed by insertion into the evacuation pipe, part of the helium that is guided into the evacuation pipe is guided into the guide pipe right after the starting of evacuation. When the gate valve is opened after the pressure inside the vacuum chamber has been reduced to a predetermined value, the helium inside the guide pipe begins to be guided into the mass spectrometer. Therefore, without waiting for the free diffusion of the helium that has been leaked from the test piece, an amount of helium sufficient to carry out a leak test at a predetermined sensitivity will reach the mass spectrometer. As a result, as compared with the leak detection system of the conventional art in which free diffusion of helium must be waited for, it is possible to shorten the time to the starting of the leak test. This results in a large reduction in time that is required to perform the leak test of the test piece.

DESCRIPTION OF EXEMPLARY EMBODIMENTS

With reference to the accompanying drawings, a description will now be made of an embodiment of a leak detection system. In this embodiment, a hermetically sealed vessel such as a tank and the like is defined as a test piece TP. This test piece TP is subjected to a leak test by disposing it inside a test chamber (vacuum chamber) in which a vacuum atmosphere can be formed.

Figure 1:
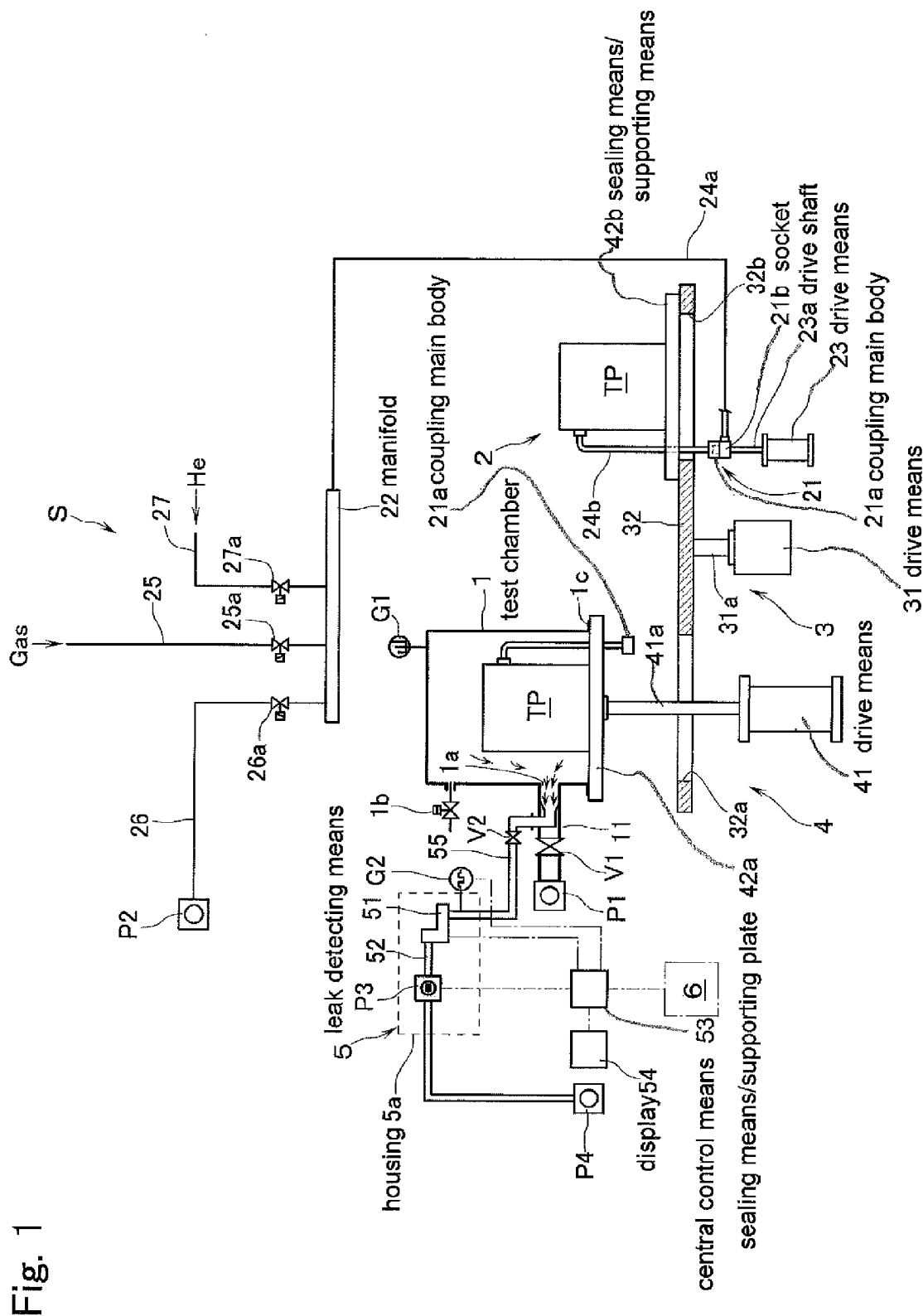
FIG. 1 is a schematic diagram showing the construction of a leak detection system according to this invention.

With reference to FIG. 1, a leak detection system S is made up of: a test chamber 1 having an opening; a filling means 2 which fills the test piece TP with helium gas; a transfer means 3 which transfers the test piece TP between a ready-for-detection position in which the test piece lies opposite to the opening of the test chamber 1 so that the test piece can be carried into the test chamber 1, and a filling-operation position in which the operation of filling the test piece TP with helium gas is performed; a carrying means 4 for carrying the test piece TP from the ready-for-detection position to a detection position inside the test chamber 1; a sealing means 42a, 42b for sealing the test chamber by hermetically closing the opening of the test chamber 1 (In an exemplary embodiment of the disclosure described hereinafter, the sealing means being the same elements as supporting plates, hence having the same reference numerals 42a, 42b, although performing different functions); a leak detecting means 5 which detects helium that may leak out of the test piece TP when, in a state in which the helium-filled test piece TP is in the detection position, the pressure inside the test chamber 1 has reached a predetermined value as a result of evacuation of the test chamber 1; and a control means 6 which central-controls each of the above-described means.

The test chamber 1 is of a bell-jar type with its bottom surface left open. The test chamber 1 is provided with an evacuation port 1a and a vent valve 1b. The evacuation port 1a has connected thereto an evacuation pipe 11 having interposed therein a gate valve V1. This evacuation pipe 11 is communicated with a vacuum pump P1. As the vacuum pump P1, a rotary pump, a turbo-molecular pump and the like is appropriately selected depending on the volume of the test chamber 1, and the pressure range inside the test chamber 1 at the time of leak test. In addition, the test chamber 1 is provided with a vacuum gauge G1 for the test chamber such as Pirani gauge, ion gauge and the like.

The filling means 2 is provided with a coupling 21 having a closing function, and a manifold 22. Although not particularly illustrated, the coupling 21 is made up of: a coupling main body 21a having therein a gas passage and a gate valve which opens and closes the gas passage; and a socket 21b which is detachably inserted into the gas passage of the coupling main body 21a. The socket 21b is coupled to a front end of a drive shaft 23a of a drive means 23 such as an air cylinder and the like which is moveable up and down. This socket 21b has also a gas passage, though not particularly illustrated, and one end of the gas passage has connected thereto a first pipe 24a which leads to the manifold 22. The gas passage of the coupling main body 21a, on the other hand, has connected thereto a second pipe 24b which is fixed to a supporting plate (to be described hereinafter). The other end of the second pipe 24b is connected to a connection opening of the test piece TP which is supported by the supporting plate. The position in which the drive shaft 23a of the drive means 23 lies opposite to one of the openings formed in the turntable (to be described hereinafter) is referred to as a filling-operation position.

When the drive means 23 is lifted in a state in which there is present the test piece TP having connected thereto the second pipe 24b, the coupling main body 21a and the socket 21b are coupled together. The first pipe 24a and the second pipe 24b are thus brought into communication with each other through the coupling 21. As a result, it becomes possible to supply the test piece TP with helium gas, and the like. When the drive means 23 is subsequently lowered from this state, the socket 21b will be released out of engagement with the coupling main body 21a, and the gate valve inside the coupling main body 21a will be closed, thereby closing the test piece TP and the second pipe 24b.

It is so arranged that the manifold 22 has connected thereto, through a gate valve 25a, a pipe 25 for supplying the test piece TP with gas such as air, rare gas, and the like for performing gross leak test, and that gas for gross leak test is supplied from the other end of the pipe 25. Further, the manifold 22 has connected thereto a pipe 26, through a gate valve 26a, for evacuating the gas out of the test piece TP after having finished the gross leak test. The other end of the pipe 26 is connected to a vacuum pump P2 such as a rotary pump and the like so that the test piece TP can be evacuated. Still furthermore, the manifold 22 has connected thereto a helium gas supply pipe 27 through a gate valve 27a so that helium gas can be filled into, or supplied to, the test piece TP.

The transfer means 3 is provided with: a drive means 31 for driving a motor and the like; and a turntable 32 which is coupled to a front end of a rotary shaft 31a of the drive means 31. The turntable 32 is made up of a circular plate of a predetermined area and has formed therein two openings 32a, 32b along the same circle and at a distance of 180 degrees from each other. One of the openings 32a, 32b lies opposite to the opening that is located in the lower surface of the test chamber 1. The turntable 32 is driven for rotation by the drive means 31 such that the supporting plate (to be described hereinafter) and, as a consequence, the test piece TP performs a swapping or exchange operation between the ready-for-detection position and the filling-operation position.

The carrying means 4 is made up of: a drive means 41 such as an air cylinder and the like which is moveable up and down, the drive means 41 being disposed below the turntable 32 at the ready-for-detection position; and two supporting plates 42a, 42b having a larger diameter than the diameter of the openings 32a, 32b and of the lower opening of the test chamber 1. The test piece TP is respectively disposed and supported in substantially the upper central portion of the supporting plates 42a, 42b.

In a state in which both the supporting plates 42a, 42b are fixed in position so as to respectively close the openings 32a, 32b of the turntable 32, the drive means 41 is moved up so that the drive shaft 41a moves upward through the opening 32a (32b) of the turntable 32. As a result of lifting the supporting plate 42a (42b) that is present in the ready-for-detection position, the peripheral edge portion (the portion that is positioned in the circumference of the test piece TP) comes into abutment with a flange portion 1c that is formed in the lower opening of the test chamber 1, thereby isolating (hermetically sealing) the test chamber 1. At this time, the test piece TP on the supporting plate 42a (42b) reaches the detection position inside the test chamber 1. As described, according to an embodiment of this invention, the supporting plates 42a, 42b themselves of the carrying means 4 to support the test piece TP serve the dual function of sealing means. It is to be noted that the portion to come into abutment with the flange portion 1c is provided with a sealing means (not illustrated) such as an O-ring and the like. Further, the sealing means may be constituted by a member that is different from the above supporting plates 42a, 42b.

The leak detecting means (leak detector) 5 has a housing 5a. Inside this housing 5a there are built in: a mass spectrometer 51; and a turbo-molecular pump (vacuum pump) P3 which is connected to the mass spectrometer 51 through an evacuation pipe 52. The operation of the leak detector 5 including the component parts is central-controlled by a central control means 53 provided with a micro-computer and the like. The vacuum pump P3, one example of which is a turbo molecular pump, has connected thereto a backing pump P4 such as a rotary pump and the like.

Figure 2:
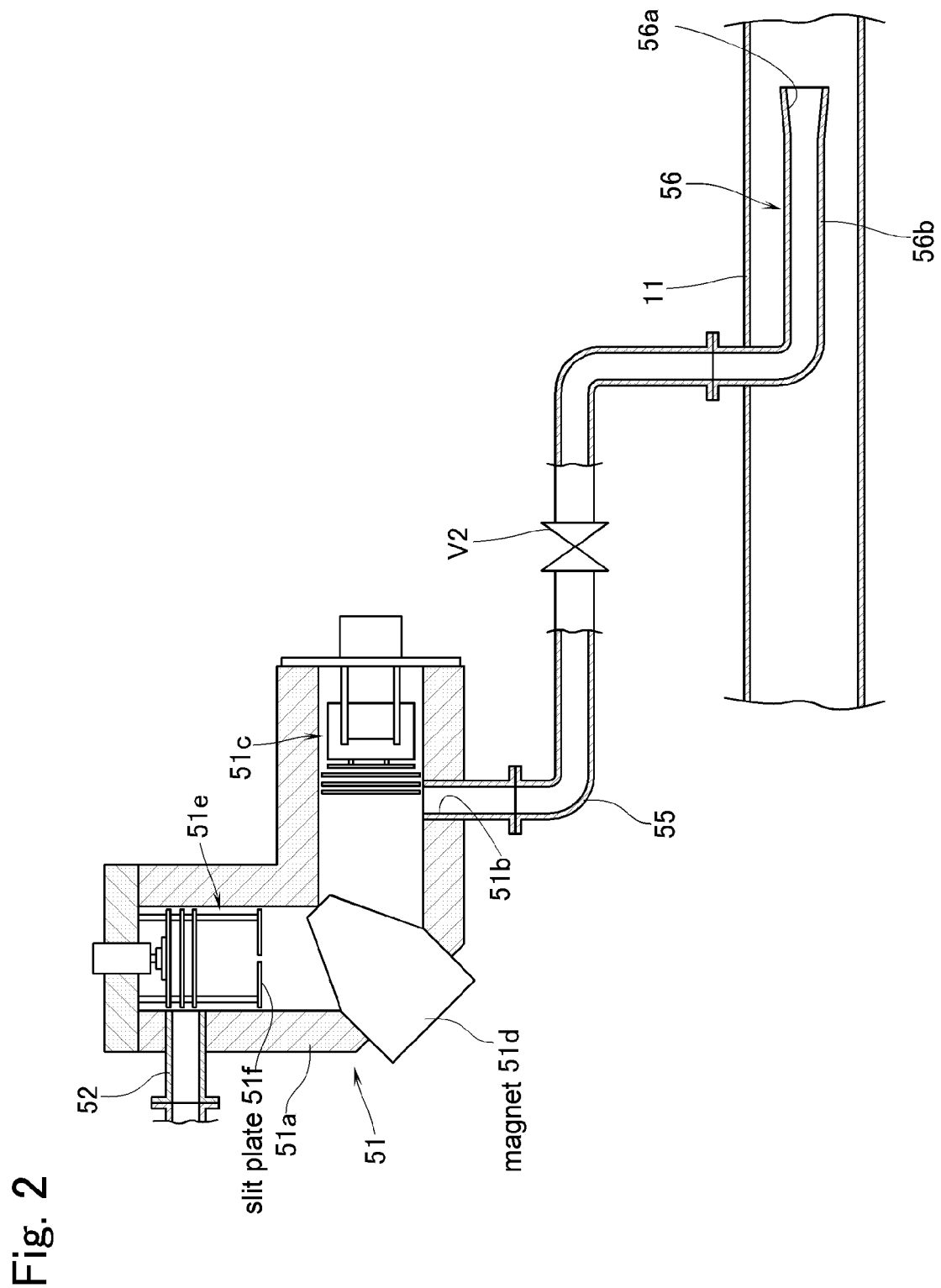
FIG. 2 is an enlarged side view, partly shown in section, of the construction of a mass spectrometer in a leak detector according to this invention.

The mass spectrometer 51 is disposed in the evacuation pipe 11 from the test chamber 1. The mass spectrometer 51 has, as shown in FIG. 2, a main body 51a which is bent into a substantially L-shape. Inside the main body 51a, there are disposed: an ion source 51c which ionizes the gas molecules in the vacuum as supplied through a gas intake port 51b which is in communication with an intake pipe (to be described hereinafter); a magnet 51d to form a magnetic field which deflects the ions from the ion source 51c at a certain acceleration voltage; and an ion collector 51e which collects helium ions. It is thus so arranged that, among the gas ions that are deflected by the magnet 51d, only the helium ions can reach the ion collector 51e through a slit plate 51f. Ion current that flows through the ion collector 51e is detected by an ammeter (not illustrated), and the ion current value at this time is outputted to the control means 53. By means of this ion current value the amount of helium leakage can be detected. In this case, there may be provided a display 54 so that the amount of helium leakage may be displayed (indicated) (see FIG. 1). In FIG. 1, the dashed lines show control signal lines between the control means 53 and each of the parts.

The gas intake port 51b of the mass spectrometer 51 has connected thereto a pipe 55 in which is interposed a gate valve V2. This pipe 55 has connected thereto a guide pipe 56 which is disposed by insertion into the evacuation pipe 11 and which has an opening portion 56a opening in a direction of the line of flow (direction as shown by arrows in FIG. 1) inside the evacuation pipe 11. The pipe 55 is provided with a vacuum gauge G2 such as a Pirani gauge, ion gauge and the like so that the pressure inside the pipe 55 leading to the mass spectrometer 51 can be measured. The guide pipe 56 has a predetermined length of tubular portion 56b which is disposed in a coaxial relationship with the evacuation pipe 11. One end of this tubular portion 56b is bent so as to pass through the pipe wall of the evacuation pipe 11 and is extended toward the outside thereof. The opening portion 56a, which is the other end of the tubular portion 56b, is expanded in diametrical direction so as to become larger in diameter toward the evacuation port 1a. It is thus so arranged that the helium gas guided into the evacuation pipe 11 at the time of evacuation of the test chamber 1 is positively guided into the mass spectrometer 51. In this case, the outside diameter of the tubular portion 56b of the guide pipe 56 shall preferably be made to fall within a range of from about ⅕ to ¼ (e.g., ¼) of the inside diameter of the evacuation pipe 11. The outside diameter at the front end of the opening portion 56a, on the other hand, shall preferably be made to fall within a range of from about ¼ to ⅓ of the inside diameter of the evacuation pipe 11.

The control unit 6 is provided with a computer, sequencer, memory, driver and the like. In addition, the control unit 6 is connected to the control means 53 of the leak detector 5 in a manner to allow for free communication therewith. It is thus so arranged that the control unit 6 performs an overall control not only of the operation of the control means 53 but also of the operations of vacuum pumps P1, P2 and the gate valves V1, 25a, 26a, 27a.

A description will now be made of the leak testing (leak inspection) of the test piece TP by means of the leak detection system according to an embodiment of this invention.

In a state in which the two supporting plates 42a, 42b are placed in predetermined positions on the turntable 32, the test piece TP is fixed in position to an upper central part of the supporting plate 42b that lies in the filling-operation position. One end of the second pipe 24b is connected to the test piece TP through a sealing means (not illustrated). This connection operation is, e.g., manually performed. The drive shaft 23a of the drive means 23 is moved up to thereby couple the coupling main body 21a and the socket 21b together. In this state, the gate valve 25a is opened so as to supply the test piece TP with gas through the first pipe 24a, thereby performing a so-called gross leak test. This gross leak test is performed by internally pressurizing the test piece TP and, at that time, by making use of the pressure fluctuations of the gas to be filled.

Once the gross leak test has been finished, the gate valve 25a is closed. At the same time, the vacuum pump P2 for evacuating the test piece TP is operated and the gate valve 26a is opened so that the test piece TP is evacuated to a predetermined pressure. When the pressure inside the test piece TP has reached a predetermined value, the gate valve 26a is closed. Then, the gate valve 27a is opened to thereby feed (supply) helium gas into the test piece TP. When a predetermined amount of helium gas has been supplied into the test piece TP, the gate valve 27a is closed and the drive shaft 23a of the drive means 23 is lowered. As a result, the coupling main body 21a and the socket 21b are brought out of engagement with each other, so that the helium gas is kept filled inside the test piece TP. At this time, in the leak detector 5, the vacuum pumps P3, P4 are operated in a state in which the gate valve V2 is kept closed. After having thus evacuated the mass spectrometer 51, the mass spectrometer 51 is calibrated by the control means 53 in a known method, and the leak detector 5 is maintained in a standby state.

Then, the turntable 32 is driven for rotation by the drive means 31 of the transfer means 3 so that the supporting plate 42b that supports the test piece TP is transferred to the ready-for-detection position. When the supporting plate 42b has reached the ready-for-detection position, the supporting plate 42b is lifted by an upward movement of the drive shaft 41a of the drive means 41. Out of the upper surface of the supporting plate 42b, the portion lying around the periphery of the test piece TP comes into abutment with the flange portion 1c formed in the bottom surface opening of the test chamber 1, so that the test chamber 1 is isolated. As a result, the test piece TP reaches the detection position inside the test chamber 1.

Once the test piece TP reaches the detection position, the test chamber 1 is evacuated by the vacuum pump P1 in a state in which the gate valve V1 is left open. Then, when the test chamber 1 has reached a predetermined pressure, the gate valve V2 is opened to thereby start the leak test. The pressure in the test chamber 1 at the time when the leak test is started (i.e., at the time when the gate valve V2 is opened) shall be within a range of from 100 Pa to 10 Pa, preferably about 100 Pa. Outside the above-described pressure range, there will occur an overload on the turbo molecular pump which serves as the vacuum pump P3. If there is a leak of helium from the test piece TP, the helium that is guided into the evacuation pipe 11 right after starting the evacuation of the test chamber 1, will be positively guided into the mass spectrometer 51. As a result, the value of ion current that flows through the ion collector 51e will be outputted to the control means 53. The amount of leak of helium is thus detected by the value of ion current at this time.

On the other hand, while the leak test is being carried out on the test piece TP in the above-described procedure, the supporting plate 42a that has reached the filling-operation position as a result of driving for rotation of the turntable 32 will have another test piece TP that is held in position thereon. The filling operation into the above-described another test piece TP is carried out in the same procedures as above so that the preparations for leak test of the above-described another test piece TP are made.

Then, when the leak test of the test piece TP has been finished, the gate valve V2 is closed, and the leak detector 5 returns to a stand-by state. In the test chamber 1, on the other hand, after the gate valve V1 in the pipe 11 is closed, the vent valve 1b is operated to return the test chamber 1 back to the atmospheric state, thereby finishing the leak test.

Once the leak test has been finished, by the lowering of the drive shaft 41a of the drive means 41, the supporting plate 42b is returned to the predetermined position on the turntable 32. The supporting plate 42b thus reaches the ready-for-detection position. Then, after having confirmed that the preparation for leak test of the above-described another test piece TP has been finished, the turntable 32 is driven for rotation. In this manner, swapping (exchange) operation is performed between the test piece TP for which the leak test has been finished and the above-described another test piece TP for which leak test is yet to be performed. When the test piece TP for which the leak test has been finished has returned to the filling-operation position, the drive shaft 23a of the drive means 23 is moved up to thereby bring the coupling main body 21a and the socket 21b into engagement with each other.

In this state, the gate valve 26a is opened and helium gas is evacuated by the vacuum pump P2 out of the test piece TP for which the leak test has been finished. Then, the drive shaft 23a of the drive means 23 is moved down to thereby release the coupling main body 21a and the socket 21b out of engagement with each other, thereby finishing a series of operations. By repeating the above operations, leak tests can be performed in succession on a plurality of test pieces.

As explained hereinabove, according to the leak detection system S of one embodiment of this invention, an arrangement has been made in which the filling operation for filling the test piece TP with helium gas, and the leak test of the test piece TP can be performed separately in the filling-operation position and in the detection position, respectively. Therefore, even in case time is required for the filling operation of one test piece TP, there will be no influence in point of the rate determination as long as this filling operation can be finished by the time when the leak test for the other test piece TP is finished. Accordingly, in case leak tests are carried out in succession for a plurality of test pieces TP, the cycle time can be prevented from becoming longer. In addition, by disposing the transfer means 3 and the carrying means 4 that performs the dual function of the sealing means 42a, 42b, the test pieces can be efficiently carried so as to perform the leak test.

In addition, the embodiment of this invention is so constructed that the transfer means 3 is provided with the turntable 32 that can be driven for rotation, and that the carrying means 4 is provided with two supporting plates 42a, 42b and the drive means 41. Therefore, by carrying the helium-gas-filled test piece TP that is in the filling-operation position into the test chamber 1, the preparations for leak test for the test piece TP in the test chamber 1 will have been finished. As a result, the cycle time can be prevented from getting longer, resulting in a more efficient leak detection system S in which the number of constituent parts has also been reduced.

Further, according to the embodiment of this invention, as the filling means 2, there is employed one in which the coupling 21 with closing function and the manifold 22 are used. Therefore, only by operating the gate valves, gross leak test and the helium-gas-filling operation can be simply performed. Further, only by releasing the coupling 21 out of engagement, the test piece TP having filled with the helium gas can be made ready for carrying to the detection position. Therefore, the leak test can further be improved in efficiency.

Still furthermore, according to the embodiment of this invention, there has been employed a leak detector 5 which is made up of: a guide pipe 56 which is disposed by insertion into the evacuation pipe 11 and which has an opening portion 56a opening in the direction of the line of flow inside the evacuation pipe 11; and a mass spectrometer 51 which is connected to the guide pipe 56. Therefore, when the helium-gas-filled test piece TP is disposed inside the test chamber 1 and the test chamber is evacuated, if the test piece TP has a leak, the helium that has been guided into the evacuation pipe 11 right after starting of the evacuation is partly guided into the guide pipe 56. As a result, without waiting for the free diffusion of the helium that has been leaked from the test piece, a sufficient amount of helium that can be subjected to leak test at a predetermined sensitivity will reach the mass spectrometer. Consequently, as compared with the conventional art in which free diffusion of helium will have to be waited for, the time to the starting of the leak test can be shortened and, in addition, the time required for the leak testing of the test pieces can be largely reduced.

Description has so far been made of a leak detection system S according to an embodiment of this invention. This invention is not limited to the above. A description was made of an embodiment in which a turntable is used as the transfer means. It need not be limited to this example, and any embodiment will do as long as the helium-gas-filled test piece TP and the leak-tested test piece TP can be swapped (exchanged) in position. In addition, a description was made of an embodiment in which one test chamber 1 is provided and helium-filling operation is performed for one test piece TP. It is, however, possible to provide the test chamber and the test piece in a plurality of pieces.

DESCRIPTION OF REFERENCE NUMERALS

S: leak detection system
1: test chamber
2: filling device
21: coupling (filling means)
22: manifold (filling means)
3: transfer means
31: drive means (transfer means)
32: turntable (transfer means)
4: carrying means
41: drive means (carrying means)
5: leak detector (leak detecting means)
51: mass spectrometer
56: guide pipe

What is claimed is:
1. A leak detection system, comprising:
  a test chamber connected to a vacuum pump;
  a filling means for filling a test piece with helium gas;
  a transfer means for transferring the test piece between a ready-for-detection position in which the test piece is ready to be carried into the test chamber and a filling-operation position in which an operation of filling the test piece with helium gas by the filling means is performed;
  a carrying means for carrying the test piece from the ready-for-detection position on the transfer means to a detection position inside the test chamber;
  a sealing means for hermetically sealing the test chamber in a state in which a helium-gas-filled test piece is in the detection position; and
  a leak detecting means for detecting helium to be leaked out of the test piece when, after having sealed the test chamber by the sealing means, the test chamber is evacuated by the vacuum pump to a predetermined pressure
  wherein a lower surface of the test chamber is open to access and the transfer means is a turntable which can be driven to rotate;
  wherein the carrying means includes:
  at least two supporting plates for respectively supporting thereon a test piece, the supporting plates being disposed on an upper surface of, and at a predetermined distance from each other in a circumferential direction of, the turntable; and
  a drive means for lifting each of the supporting plates by passing through the turntable so as to bring a peripheral portion of the supporting plate into abutment with the lower surface of the test chamber, the peripheral portion being positioned in a circumference of the test piece; and
  wherein the supporting plate also serves as the sealing means for hermetically sealing the test chamber.

2. The leak detection system according to claim 1,
  wherein the filling means includes a coupling with closing function, and a manifold which is connected to the coupling through piping, and
  wherein at least one of a helium supply pipe, a gas supply pipe for gross leak test, or an evacuation pipe for evacuating the test piece is connected to the manifold respectively through a gate valve.

3. The leak detection system according to claim 1,
  wherein the filling means includes a coupling with closing function, and a manifold which is connected to the coupling through piping, and
  wherein at least one of a helium supply pipe, a gas supply pipe for gross leak test, or an evacuation pipe for evacuating the test piece is connected to the manifold respectively through a gate valve.

4. The leak detection system according to claim 1, wherein the leak detecting means comprises:
  a guide pipe disposed by insertion into an evacuation pipe which is connected from the test chamber in which the test piece is disposed to the vacuum pump; and
  a mass spectrometer for detecting helium, the mass spectrometer being connected to the guide pipe through a gate valve.

5. The leak detection system according to claim 1, wherein the leak detecting means comprises:
  a guide pipe disposed by insertion into an evacuation pipe which is connected from the test chamber in which the test piece is disposed to the vacuum pump; and
  a mass spectrometer for detecting helium, the mass spectrometer being connected to the guide pipe through a gate valve.

6. The leak detection system according to claim 2, wherein the leak detecting means comprises:
  a guide pipe disposed by insertion into an evacuation pipe which is connected from the test chamber in which the test piece is disposed to the vacuum pump; and
  a mass spectrometer for detecting helium, the mass spectrometer being connected to the guide pipe through a gate valve.

7. The leak detection system according to claim 3, wherein the leak detecting means comprises:
  a guide pipe disposed by insertion into an evacuation pipe which is connected from the test chamber in which the test piece is disposed to the vacuum pump; and
  a mass spectrometer for detecting helium, the mass spectrometer being connected to the guide pipe through a gate valve.

* * * * *